US012776830B2

(12) United States Patent
Kojima et al.

(10) Patent No.: US 12,776,830 B2
(45) Date of Patent: Oct. 27, 2026

(54) COMMUNICATION SYSTEM AND COMMUNICATION METHOD

(71) Applicant: NTT, Inc., Tokyo (JP)

(72) Inventors: Yasuyoshi Kojima, Musashino (JP); Daisuke Goto, Musashino (JP); Kiyohiko Itokawa, Musashino (JP); Kazumitsu Sakamoto, Musashino (JP); Tomoya Kageyama, Musashino (JP)

(73) Assignee: NTT, Inc., Tokyo (JP)

( * ) Notice: Subject to any disclaimer, the term of this patent is extended or adjusted under 35 U.S.C. 154(b) by 276 days.

(21) Appl. No.: 18/728,989

(22) PCT Filed: Jan. 18, 2022

(86) PCT No.: PCT/JP2022/001570
§ 371 (c)(1),
(2) Date: Jul. 15, 2024

(87) PCT Pub. No.: WO2023/139638
PCT Pub. Date: Jul. 27, 2023

(65) Prior Publication Data
US 2025/0106734 A1 Mar. 27, 2025

(51) Int. Cl.
*G16Y 10/75* (2020.01)
*H04B 7/185* (2006.01)
(Continued)

(52) U.S. Cl.
CPC ........... *H04B 7/18513* (2013.01); *H04B 7/19* (2013.01); *H04B 7/195* (2013.01); *H04L 1/0002* (2013.01); *H04L 1/0015* (2013.01); *H04L 1/0023* (2013.01); *H04W 28/021* (2013.01); *H04W 28/0231* (2013.01); *H04W 28/0247* (2013.01); *H04W 28/04* (2013.01); *H04W 28/06* (2013.01);
(Continued)

(58) Field of Classification Search
CPC .............. G16Y 10/75; H04B 7/14–216; H04L 1/0001–0039; H04W 24/02–10; H04W 28/02–26; H04W 48/02–20; H04W 72/02–569; H04W 76/10–50; H04W 84/005–22; H04W 88/005–188; H04W 92/02–24; H04W 99/00; Y02D 30/70
See application file for complete search history.

(56) References Cited

U.S. PATENT DOCUMENTS

2023/0224023 A1* 7/2023 Kang ................. H04B 7/18513

FOREIGN PATENT DOCUMENTS

JP 2010239410 A * 10/2010 ............ H04W 84/06
WO WO-2019097855 A1 * 5/2019 ............ H04W 84/06

OTHER PUBLICATIONS

Boya Di et al., "Ultra-dense LEO: Integrating Terrestrial-Satellite Networks into 5G and Beyond for Data Offloading", IEEE Transactions on Wireless Communications, vol. 18, Issue 1, Jan. 2019.

* cited by examiner

*Primary Examiner* — Timothy J Weidner

(57) ABSTRACT

A second communication device transmits notification information related to a communication status between a transmission device and a first communication device to the transmission device. The transmission device determines a transmission method of data to the first communication device on the basis of the notification information received from the second communication device, and transmits the data to the first communication device by the determined transmission method.

7 Claims, 8 Drawing Sheets

(51) Int. Cl.

| | |
|---|---|
| ***H04B 7/19*** | (2006.01) |
| ***H04B 7/195*** | (2006.01) |
| ***H04L 1/00*** | (2006.01) |
| ***H04W 28/02*** | (2009.01) |
| ***H04W 28/04*** | (2009.01) |
| ***H04W 28/06*** | (2009.01) |
| ***H04W 28/18*** | (2009.01) |
| ***H04W 84/06*** | (2009.01) |
| ***H04W 88/02*** | (2009.01) |
| ***H04W 88/08*** | (2009.01) |
| ***H04W 88/12*** | (2009.01) |
| ***H04W 92/02*** | (2009.01) |
| ***H04W 92/10*** | (2009.01) |
| ***H04W 92/12*** | (2009.01) |

(52) U.S. Cl.

CPC ............. *H04W 28/18* (2013.01); *G16Y 10/75* (2020.01); *H04W 84/06* (2013.01); *H04W 88/02* (2013.01); *H04W 88/085* (2013.01); *H04W 88/12* (2013.01); *H04W 92/02* (2013.01); *H04W 92/10* (2013.01); *H04W 92/12* (2013.01)

COMMUNICATION SYSTEM AND COMMUNICATION METHOD

CROSS-REFERENCE TO RELATED APPLICATIONS

This application is a 371 U.S. National Phase of International Application No. PCT/JP2022/001570, filed on Jan. 18, 2022. The entire disclosure of the above application is incorporated herein by reference.

TECHNICAL FIELD

The present invention relates to a communication system and a communication method.

BACKGROUND ART

With the development of Internet of Things (IoT) technology, it has been studied to install IoT terminals including various sensors in various places. For example, it is also assumed that the IoT is used to collect data of a place where it is difficult to install a base station, such as a buoy or a ship on the sea or a mountainous area. Meanwhile, there is a technology of wirelessly communicating with a communication device on the ground using a low earth orbit (LEO) satellite (see, for example, Non Patent Literature 1).

CITATION LIST

Non Patent Literature

Non Patent Literature 1: Wei Feng, et al. "Ultra-dense LEO: Integrating Terrestrial-Satellite Networks into 5G and Beyond for Data Offloading", IEEE Transactions on Wireless Communications, Volume 18, No. 1, January 2019

SUMMARY OF INVENTION

Technical Problem

Since the LEO satellite is constantly moving as seen from the earth, communication opportunities between a transmission device on the ground and the LEO satellite are limited. Therefore, it is required to increase a communication probability between the transmission device and the LEO satellite in the limited communication opportunities.

In view of the above circumstances, an object of the present invention is to provide a communication system and a communication method capable of increasing a communication probability between a communication device that performs communication while moving and a transmission device on the ground in a limited communication opportunity in communication between the communication device and the transmission device.

Solution to Problem

One aspect of the present invention is a communication system including: a first communication device that performs communication while moving; a transmission device that transmits data to the first communication device; and a second communication device that communicates with the transmission device, in which the second communication device transmits notification information related to a communication status between the transmission device and the first communication device to the transmission device, and the transmission device determines a transmission method of the data to the first communication device on a basis of the notification information received from the second communication device, and transmits the data to the first communication device by the determined transmission method.

One aspect of the present invention is a communication method by a first communication device that performs communication while moving, a transmission device that transmits data to the first communication device, and a second communication device that communicates with the transmission device, the communication method including: a step of transmitting, by the second communication device, notification information related to a communication status between the transmission device and the first communication device to the transmission device; a step of determining, by the transmission device, a transmission method of the data to the first communication device on a basis of the notification information received from the second communication device; and a step of transmitting, by the transmission device, the data to the first communication device by the determined transmission method.

Advantageous Effects of Invention

According to at least one of the above-described aspects, it is possible to increase a communication probability between a communication device that performs communication while moving and a transmission device on the ground in a limited communication opportunity in communication between the communication device and the transmission device.

DESCRIPTION OF EMBODIMENTS

Hereinafter, embodiments of the present invention will be described in detail with reference to the drawings.

First Embodiment

Figure 1:
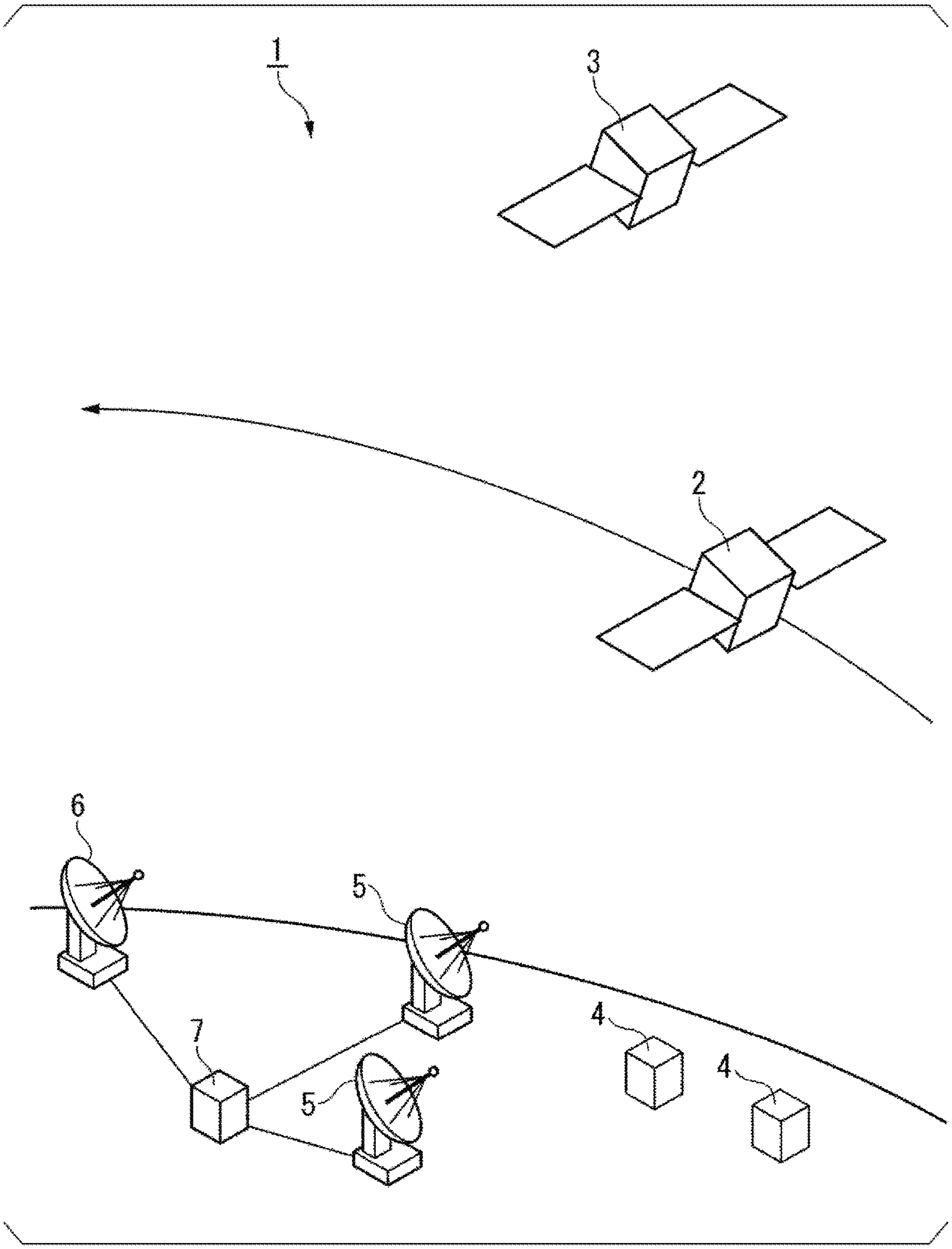
FIG. 1 is a configuration diagram of a wireless communication system according to an embodiment.

FIG. 1 is a configuration diagram of a wireless communication system 1 according to an embodiment. A wireless communication system 1 includes an LEO satellite 2, a geostationary orbit (GEO) satellite 3, a terminal station 4, a gateway for LEO satellite (GWL) 5, a gateway for GEO satellite (GWG) 6, and a base station 7. The number of each of the LEO satellite 2, the GEO satellite 3, the terminal station 4, the GWL 5, the GWG 6, and the base station 7 included in the wireless communication system 1 is one or more. Note that it is supposed that the number of the terminal stations 4 is large.

The LEO satellite 2 relays communication between the terminal station 4 and the base station 7. Specifically, when passing over the terminal station 4, the LEO satellite 2 receives a signal from the terminal station 4 and stores the signal as spectral data. In addition, when passing over the GWL 5, the LEO satellite 2 transmits a signal on which the stored spectral data is superimposed.

The GEO satellite 3 receives notification information indicating a communication status between the LEO satellite 2 and the terminal station 4 from the base station 7, and transmits the notification information to the terminal station 4.

The terminal station 4, the GWL 5, the GWG 6, and the base station 7 are installed on the earth, such as on the ground or on the sea. The terminal station 4 is, for example, an IoT terminal. The GWL 5 and the GWG 6 are earth stations. The terminal station 4 stores and transmits sensor data to the LEO satellite 2. The base station 7 receives the spectral data from the LEO satellite 2 via the GWL 5 and reproduces the sensor data. In addition, the base station 7 transmits the notification information generated by analyzing the communication status between the LEO satellite 2 and the terminal station 4 on the basis of the spectral data received from the LEO satellite 2 to the GEO satellite 3 via the GWG 6. The GWL 5 is an antenna station provided to implement MIMO communication between the base station 7 and the LEO satellite 2. A plurality of the GWLs 5 is arranged at positions separated from each other so as to increase a difference in angles of arrival of signals from a plurality of antennas included the LEO satellite 2. Each GWL 5 converts the signal received from the LEO satellite 2 into an electrical signal and outputs the electrical signal to the base station 7. The GWG 6 is an antenna station provided to implement communication between the base station 7 and the GEO satellite 3. The GWG 6 converts an electrical signal transmitted from the base station into a wireless signal and transmits the wireless signal to the GEO satellite 3.

Hereinafter, the LEO satellite 2 and the GEO satellite 3 are also collectively referred to as satellites, and the GWL 5 and the GWG 6 are also collectively referred to as earth stations. In addition, the wireless signal from the terminal station 4 to the satellite is referred to as a terminal uplink signal, and the wireless signal from the satellite to the terminal station 4 is referred to as a terminal downlink signal. The wireless signal from the earth station to the satellite is referred as an earth station uplink signal, and the wireless signal from the satellite to the earth station is referred as an earth station downlink signal.

The LEO satellite 2 has a property of constantly moving as viewed from the earth. The LEO satellite 2 has an altitude of 2000 km or less and orbits in the air over the earth once every about 1.5 hours. The terminal station 4 and the LEO satellite 2 can communicate with each other when the terminal station 4 is present within a footprint of the LEO satellite 2. The GEO satellite 3 has an altitude of about 36000 km and orbits in the air over the earth once a day. The GEO satellite 3 is always located at the same location in the sky when viewed from the earth. The terminal station 4 and the GEO satellite 3 can always communicate with each other. That is, a communicable period between the terminal station 4 and the GEO satellite 3 is longer than a communicable period between the terminal station 4 and the LEO satellite 2. In an area where many terminal stations 4 are present, the plurality of terminal stations 4 attempts to communicate with the LEO satellite 2 at the same time in a limited communication opportunity, so that a collision between the terminal uplink signals is likely to occur, and a communication probability may be reduced.

Therefore, in the wireless communication system 1 of the present embodiment, the GEO satellite 3 having a relatively high communication probability with the terminal station 4 transmits the notification information regarding the communication status with the LEO satellite 2 to the terminal station 4. Then, the terminal station 4 determines a transmission scheme that increases the communication probability with the LEO satellite 2 on the basis of a notification signal. The GEO satellite 3, which is always at the same position as viewed from the earth, can always communicate with the terminal station 4. Therefore, the LEO satellite 2 can reliably transmit the latest notification information to the terminal station 4.

Figure 2:
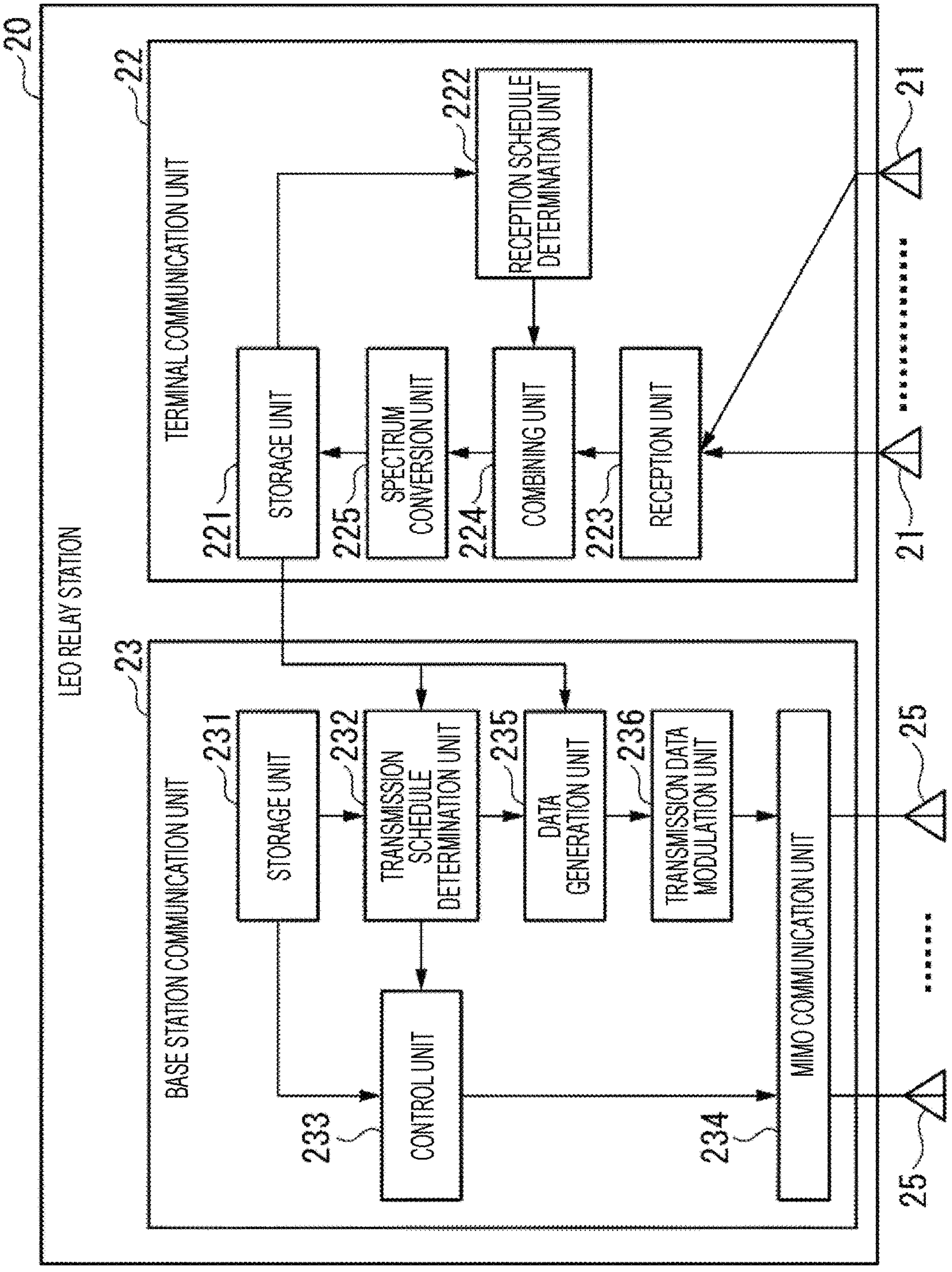
FIG. 2 is a block diagram illustrating a configuration of an LEO relay station included in an LEO satellite according to the embodiment.

A configuration of each device will be described. FIG. 2 is a block diagram illustrating a configuration of an LEO relay station 20 included in the LEO satellite 2 according to the embodiment.

The LEO relay station 20 includes a plurality of first antennas 21, a terminal communication unit 22, a base station communication unit 23, and a plurality of second antennas 24. The first antenna 21 is used for communication with the terminal station 4. The second antenna 24 is used for communication with the base station 7. The terminal communication unit 22 includes a storage unit 221, a reception schedule determination unit 222, a reception unit 223, a combining unit 224, and a spectrum conversion unit 225.

The storage unit 221 stores position data of the terminal stations 4 and orbit data of the LEO satellite 2. The position data of the terminal stations 4 is represented by, for example, latitude and longitude. The orbit data of the LEO satellite 2 is data from which the position, velocity, movement direction, and the like of the LEO satellite 2 at arbitrary time can be obtained. The storage unit 221 has a storage area for storing the spectral data of the terminal uplink signal received from the terminal station 4.

The reception schedule determination unit 222 specifies timing at which the signal is received from each terminal station 4 on the basis of the position data of the terminal stations 4 and the orbit data stored in the storage unit 221. The reception unit 223 receives signals via the plurality of first antennas 21.

The combining unit 224 combines a plurality of signals received by the reception unit 223 via the plurality of first antennas 21 according to a predetermined combination parameter. The combination parameter is represented by, for example, an offset of a phase and amplitude of each first antenna 21. Note that the combination parameter is obtained on the basis of reception timing of the signal determined by the reception schedule determination unit 222 and the positional relationship between the LEO satellite 2 and the terminal station 4 as a communication partner at the reception timing. Note that, in other embodiments, the combination parameter may be a constant value at all times. The combining unit 224 reproduces the terminal uplink signals by combining the signals.

The spectrum conversion unit 225 converts the signal combined by the combining unit 224 into a frequency spectrum. The spectrum conversion unit 225 obtains a frequency spectrum of the received signal by fast Fourier transform (FFT), for example. The spectrum conversion unit 225 records spectral data representing the generated frequency spectrum in the storage unit 221. The spectral data is represented by a combination of a frequency and power of the frequency.

The base station communication unit 23 transmits spectral data representing a waveform of the terminal uplink signal received by the terminal communication unit 22 to the base station 7 by MIMO. The base station communication unit 23 includes a storage unit 231, a transmission schedule determination unit 232, a control unit 233, a MIMO communication unit 234, a data generation unit 235, and a transmission data modulation unit 236.

The storage unit 231 stores a communication time zone with the base station 7 obtained in advance based on a position of the base station 7 and an orbit of the LEO satellite 2. The storage unit 231 further stores in advance a weight of the base station downlink signal transmitted from each second antenna 24 for each transmission time in the communication time zone. The transmission time may be represented by, for example, an elapsed time from the transmission start timing. The weight for each transmission time is calculated on the basis of the orbit data of the LEO satellite 2 and the position of each GWL 5.

The transmission schedule determination unit 232 determines a transmission time zone for each spectral data on the basis of the number of pieces of the spectral data stored in the storage unit 221 and the communication time zone. For example, the transmission schedule determination unit 232 determines the transmission time of each piece of the spectral data by dividing the length of the communication time zone by the number of pieces of spectral data and determines the transmission time zone of each piece of spectral data by separating the communication time zone by the transmission time.

The control unit 233 issues an instruction on the weight for each transmission time read from the storage unit 231 to the MIMO communication unit 234. The MIMO communication unit 234 establishes MIMO communication with the base station 7 according to a predetermined protocol.

The data generation unit 235 converts the spectral data stored in the storage unit 221 into a parallel signal and modulates the parallel signal. The modulated parallel signal is weighted with the weight instructed from the control unit 233 and is transmitted from each second antenna 24 as the base station downlink signal.

Figure 3:
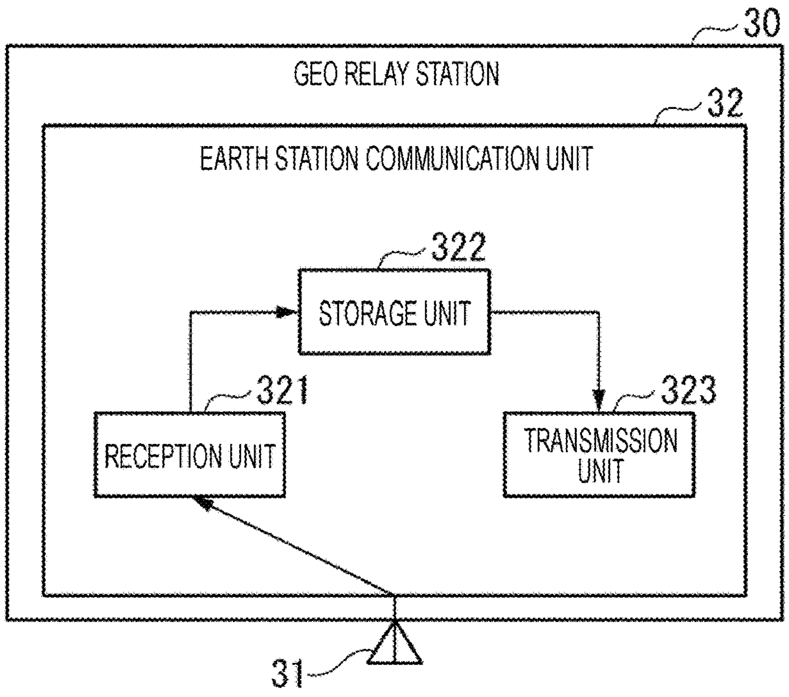
FIG. 3 is a block diagram illustrating a configuration of a GEO relay station included in a GEO satellite according to the embodiment.

FIG. 3 is a block diagram illustrating a configuration of a GEO relay station 30 included in the GEO satellite 3 according to the embodiment. The GEO relay station 30 includes an antenna 31 and an earth station communication unit 32. The antenna 31 is used for communication with the terminal station 4 and the base station 7. The earth station communication unit 32 includes a reception unit 321, a storage unit 322, and a transmission unit 323.

The reception unit 321 receives the base station uplink signal from the GWG 6 via the antenna 31. The base station uplink signal includes the notification information generated by the base station 7. The notification information includes the orbit information of the LEO satellite 2, and the transmission scheme and a transmission frequency for each area on the ground. The orbit information is indicated by time series of the latitude and longitude of the LEO satellite 2. Each area is obtained by dividing the ground into a plurality of meshes, for example, and is represented by the latitude and longitude of four corners of the mesh. As the transmission scheme, a multi-value number, a bit count of an error correction code, and transmission power are designated. Note that, in other embodiments, an error detection code may be added instead of the error correction code. The transmission frequency is a frequency at which the terminal station 4 transmits the terminal uplink signal in the communication time zone. The storage unit 322 stores the notification information received by the reception unit 321. The transmission unit 323 transmits the notification information stored in the storage unit 322 to the terminal station 4 via the antenna 31 by the terminal downlink signal. As a result, the GEO relay station 30 can reliably transmit, to the terminal station 4, the notification information indicating an analysis result of the communication status between the LEO satellite 2 and the terminal station 4 by the base station 7.

Figure 4:
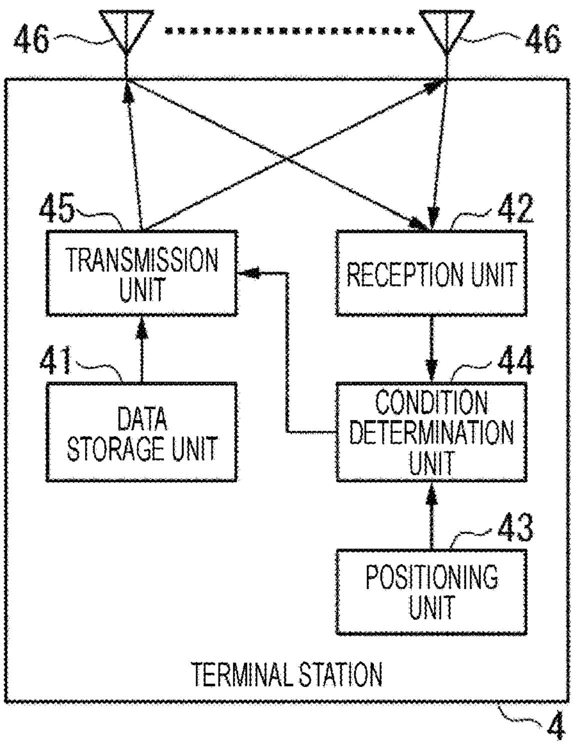
FIG. 4 is a block diagram illustrating a configuration of a terminal station according to the embodiment.

FIG. 4 is a block diagram illustrating a configuration of the terminal station 4 according to the embodiment.

The terminal station 4 includes a data storage unit 41, a reception unit 42, a positioning unit 43, a condition determination unit 44, a transmission unit 45, and one or a plurality of antennas 46. The terminal station 4 is an example of a transmission device that transmits data to a communication device. The data storage unit 41 stores the sensor data. The reception unit 42 receives the terminal downlink signals from the GEO satellite 3 via the plurality of antennas 46, and reads the notification information. The positioning unit 43 specifies the position of the terminal station 4 on the ground by a global navigation satellite system (GNSS) and specifies the area in which the terminal station 4 is located.

The condition determination unit 44 reads the transmission scheme associated with the area in which the local station is located from the notification information read by the reception unit 42, and determines the transmission scheme of the transmission unit 45. In addition, the condition determination unit 44 specifies the transmission time zone of the terminal uplink signal on the basis of the orbit data of the LEO satellite 2 included in the notification information. That is, the condition determination unit 44 specifies a time zone in which the position where the terminal station 4 exists is within a coverage of the first antenna 21 included in the LEO satellite 2 as the transmission time zone of the terminal uplink signal. The condition determination unit 44 randomly determines transmission start timing on the basis of the specified transmission time zone and the transmission frequency indicated by the notification information. For example, the condition determination unit 44 determines the number of times of transmission of the terminal uplink signal from the specified transmission time zone and transmission frequency, and determines the transmission start timing on the basis of a random number so that transmission periods of the terminal uplink signals do not overlap. As a result, the communication timing can be shifted between the terminal stations 4, and communication efficiency can be improved.

The transmission unit 45 wirelessly transmits, from the antenna 46, the terminal uplink signal in which the sensor data stored in the data storage unit 41 is set as terminal transmission data, according to the transmission start timing and the transmission scheme determined by the condition determination unit 44. That is, the transmission unit 45 transmits the signal using the multi-value number, the error correction code, and the transmission power stored in the notification information from the LEO satellite 2. The transmission unit 45 transmits the signal by, for example, low power wide area (LPWA). Examples of the LPWA include LoRaWAN (registered trademark), Sigfox (registered trademark), long term evolution for machines (LTE-M), and narrow band (NB)-IoT, but any wireless communication scheme can be used. The transmission unit 45 may perform transmission with another terminal station 4 by time-division multiplexing, orthogonal frequency division multiplexing (OFDM), MIMO, or the like. The transmission unit 45 determines a channel to be used by the local station to transmit the terminal uplink signal and transmission timing by a method determined in advance in a wireless communication scheme to be used. The transmission unit 45 may also perform beam formation of the signals to be transmitted from the plurality of antennas 46 by a method determined in advance in the wireless communication scheme to be used.

Figure 5:
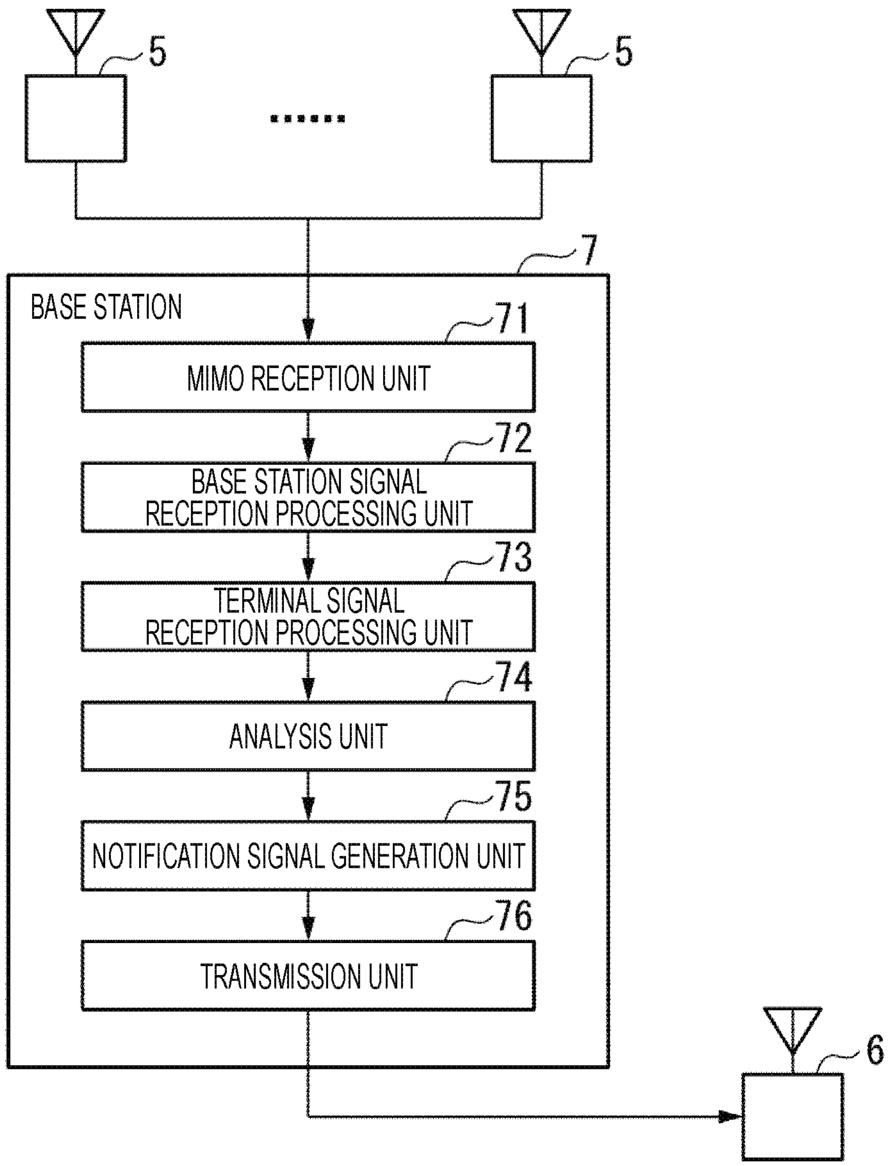
FIG. 5 is a block diagram illustrating a configuration of a base station according to the embodiment.

FIG. 5 is a block diagram illustrating a configuration of the base station 7 according to the embodiment. The base station 7 includes a MIMO reception unit 71, a base station signal reception processing unit 72, a terminal signal reception processing unit 73, an analysis unit 74, a notification information generation unit 75, and a transmission unit 76.

The MIMO reception unit 71 aggregates the base station downlink signals received from the plurality of GWLs 5. The MIMO reception unit 71 stores the weight for each reception time for the base station downlink signal received by each GWL 5 on the basis of the orbit data of the LEO satellite 2 and the position of each GWL 5. For example, the reception time may be represented by an elapsed time from reception start timing. The MIMO reception unit 71 multiplies the base station downlink signal input from each GWL 5 by the weight corresponding to the reception time of the base station downlink signal and combines the received signals multiplied by the weights. The same weight may be used regardless of the reception time. The base station signal reception processing unit 72 demodulates and decodes the combined received signal, thereby obtaining demodulation information. The base station signal reception processing unit 72 outputs the demodulation information to the terminal signal reception processing unit 73.

The terminal signal reception processing unit 73 performs reception processing for the terminal uplink signal. The terminal signal reception processing unit 73 decodes a symbol of the terminal uplink signal from the spectral data indicated by the demodulation information to obtain the terminal transmission data transmitted from the terminal station 4. In other words, the terminal signal reception processing unit 73 decodes the symbol of the terminal uplink signal by converting a frequency domain waveform indicated by the spectral data into a time domain waveform.

The analysis unit 74 analyzes the communication status between the terminal station 4 and the LEO satellite 2 on the basis of the terminal uplink signal received by the terminal signal reception processing unit 73. The analysis unit 74 calculates, for example, a decoding success rate of the terminal uplink signal for each area. The decoding success rate of the terminal uplink signal is an example of a statistical value of the communication probability. In a case where the decoding success rate of the terminal uplink signal is lower than a predetermined threshold, the analysis unit 74 adjusts the transmission scheme and the communication timing between the terminal station 4 and the LEO satellite 2.

In a case where the decoding success rate becomes lower than the threshold, the analysis unit 74 changes the transmission scheme so as to increase the transmission quality. Specifically, in the case where the decoding success rate becomes lower than the threshold, the analysis unit 74 decreases the multi-value number, increases the bit count of the error correction code, and increases the transmission power. The smaller the multi-value number, the lower a symbol error rate and the higher the transmission quality. Further, the longer the error correction code, the larger the bit count in which an error can be corrected, and the higher the transmission quality. In addition, the larger the transmission power, the lower an SN ratio, and the lower a probability of occurrence of an error. Note that, in the case of using the error detection code instead of the error correction code, the analysis unit 74 increases the bit count of the error detection code in the case where the decoding success rate becomes lower than the threshold.

The analysis unit 74 decreases the transmission frequency of the terminal uplink signal in the case where the decoding success rate becomes lower than the threshold. Since the terminal station 4 randomly determines the transmission start timing of the terminal uplink signal from the transmission time zone, the lower the transmission frequency of the terminal uplink signal, the lower the probability of occurrence of collision of the terminal uplink signal.

The notification information generation unit 75 generates the notification information indicating an analysis result of the analysis unit 74. Specifically, the notification information generation unit 75 generates notification information including information in which an area is associated with a transmission scheme and a communication timing related to the area, and orbit information of the LEO satellite 2. The transmission unit 76 transmits the notification information generated by the notification information generation unit 75 to the GEO satellite 3 via the GWG 6 as the base station uplink signal.

Figure 6:
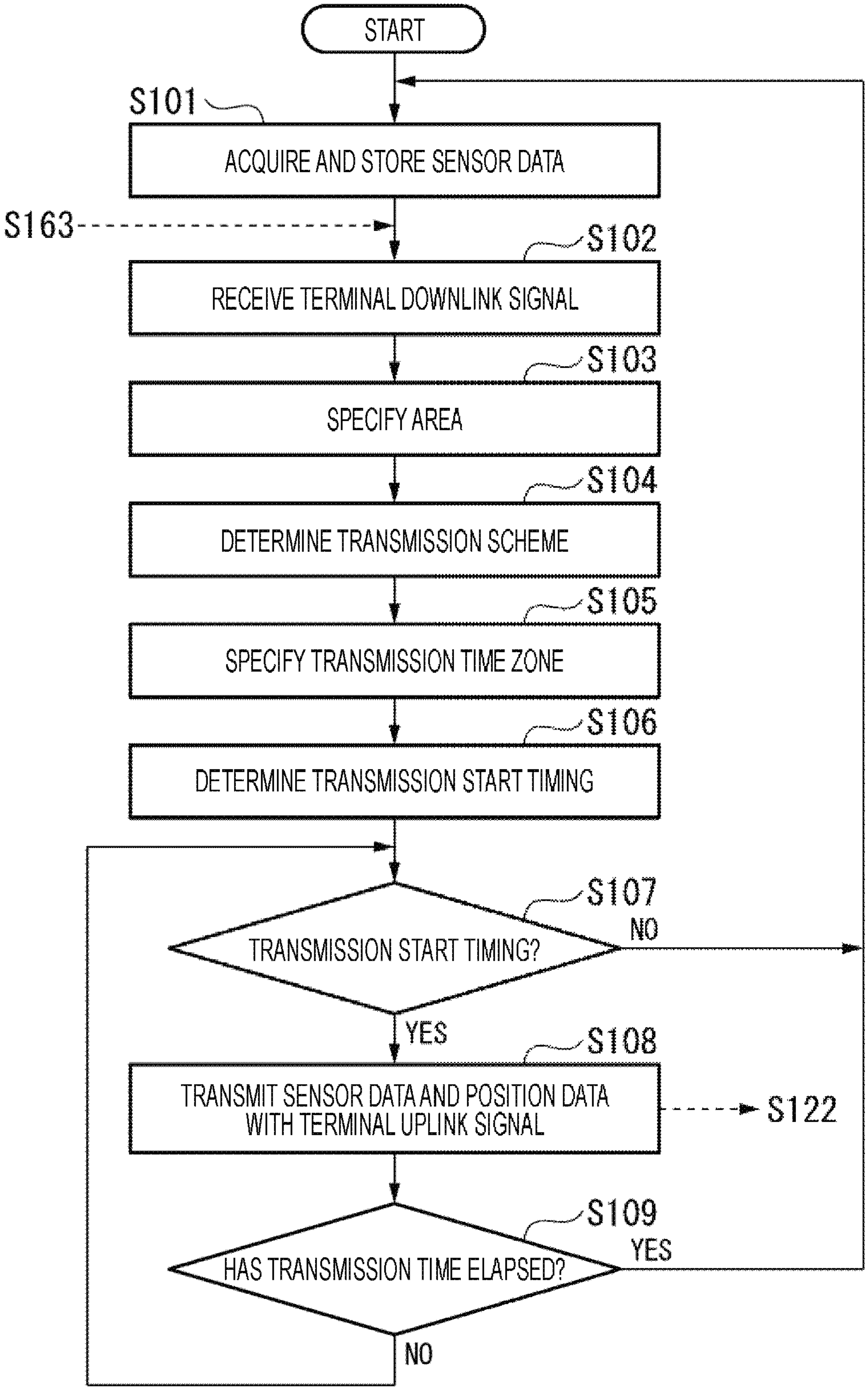
FIG. 6 is a flowchart illustrating processing of the terminal station according to the embodiment.

An operation of the wireless communication system 1 will be described. FIG. 6 is a flowchart illustrating processing of the terminal station 4 according to the embodiment.

The terminal station 4 acquires data detected by a sensor (not illustrated) provided outside or inside thereof and writes the acquired data to the data storage unit 41 (step S101). The reception unit 42 of the terminal station 4 receives the terminal downlink signal transmitted from the GEO satellite 3 (step S102). The positioning unit 43 specifies the position of the terminal station 4 on the ground and specifies the area in which the terminal station 4 is located by a global navigation satellite system (GNSS) (step S103).

The condition determination unit 44 reads the transmission scheme associated with the area to which the local station belongs from the notification information included in the terminal downlink signal received in step S102, and determines the transmission scheme of the transmission unit 45 (step S104). In addition, the condition determination unit 44 specifies the transmission time zone of the terminal uplink signal on the basis of the orbit data of the LEO satellite (step S105).

The condition determination unit 44 randomly determines the transmission start timing of the terminal uplink signal on the basis of the specified transmission time zone and the transmission frequency associated with the area to which the local station belongs in the notification information (step S106). The transmission unit 45 determines whether the current time is the transmission start timing (step S107). In a case where the current time is not the transmission start timing (step S107: NO), the terminal station 4 returns the processing to step S101.

On the other hand, in the case of determining that the current time is the transmission start timing of the uplink signal (step S107: YES), the transmission unit 45 reads the sensor data from the data storage unit 41, sets the read sensor data as the terminal transmission data, and sets the terminal transmission data for the terminal uplink signal of the transmission scheme determined in step S104. The transmission unit 45 wirelessly transmits the terminal uplink signal in which the terminal transmission data is set through the antenna 46 (step S108).

The transmission unit 45 determines whether a predetermined transmission time has elapsed from the transmission start timing (step S109). In a case where the transmission time has not elapsed (step S109: NO), the terminal station 4 returns the processing to step S107. Therefore, the terminal station 4 continuously transmits the uplink signals during the transmission time zone.

Figure 7:
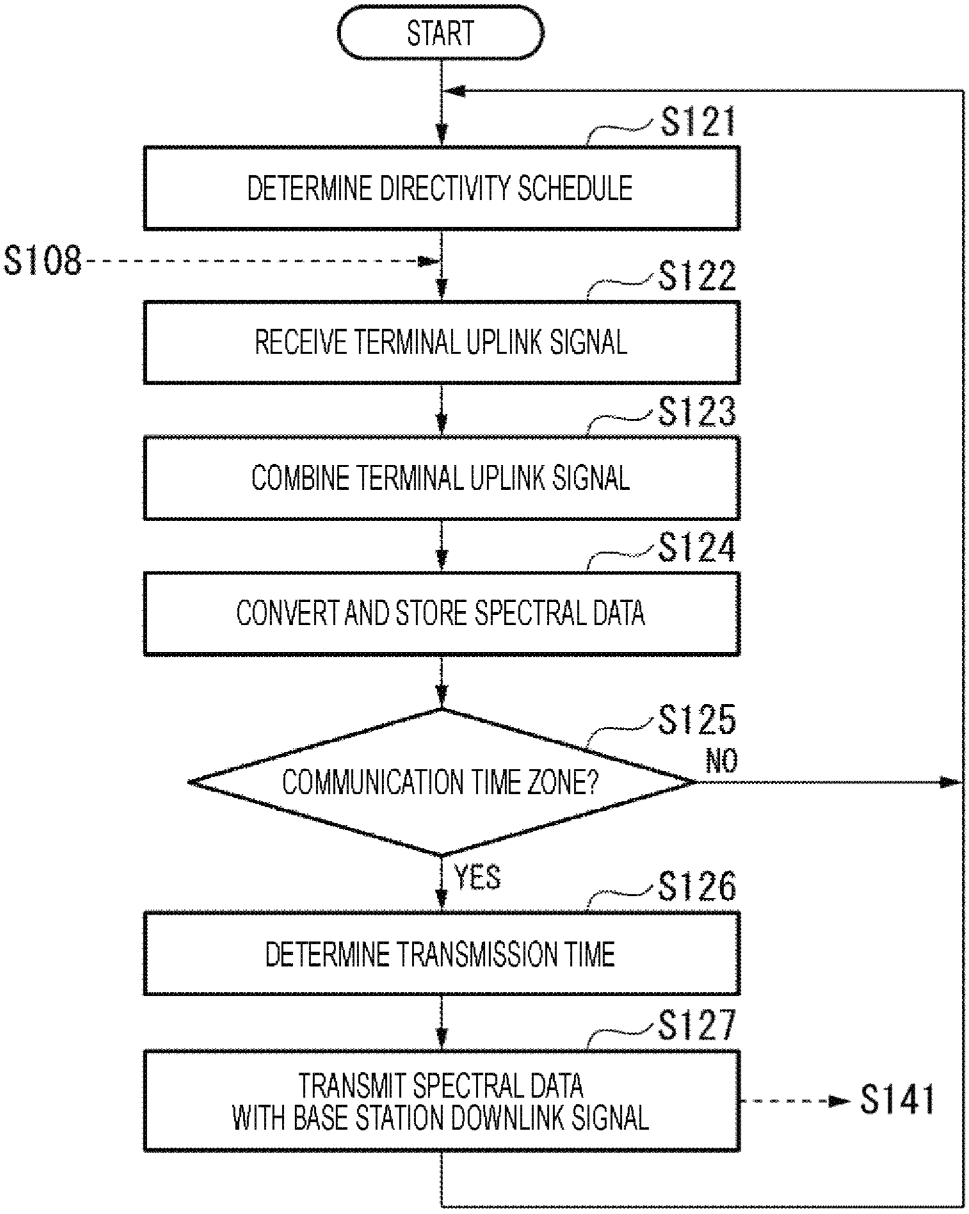
FIG. 7 is a flowchart illustrating processing of the LEO relay station according to the embodiment.

FIG. 7 is a flowchart illustrating processing of the LEO relay station 20 according to the embodiment. The reception schedule determination unit 222 of the LEO satellite 2 determines, for each time, the terminal station 4 from which the terminal uplink signal is to be received on the basis of the position data of the terminal station 4 and the orbit data stored in the storage unit 221 (step S121). A plurality of the reception units 223 receives the terminal uplink signals transmitted from the terminal station 4 (step S122). Depending on the wireless communication schemes of the terminal stations 4 serving as transmission sources, there are some cases where the terminal uplink signal is received from only one terminal station 4 by time division at the same frequency, or there are some cases where the terminal uplink signals are simultaneously received from a plurality of the terminal stations 4 at the same frequency. The combining unit 224 combines the terminal uplink signals received by the plurality of reception units 223 according to a predetermined combination parameter (step S123). The spectrum conversion unit 225 converts the signal combined by the combining unit 224 into spectral data and records the spectral data in the storage unit 221 (step 124).

The transmission schedule determination unit 232 determines whether the current time is included in the communication time zone with the base station 7 by referring to the storage unit 231 (step S125). In a case where the current time is not included in the communication time zone with the base station 7 (step S125: NO), the processing returns to step S121. Meanwhile, in a case where the current time is included in the communication time zone with the base station 7 (step S125: YES), the transmission schedule determination unit 232 determines the transmission time for each spectral data on the basis of the number of pieces of spectral data stored in the storage unit 221 and the length of the communication time zone with the base station 7 (step S126).

The data generation unit 235 performs parallel conversion for the spectral data stored in the storage unit 221, and the transmission data modulation unit 236 modulates the parallel-converted spectral data. The MIMO communication unit 234 weights the transmission data modulated by the transmission data modulation unit 236 with the weight instructed by the control unit 233 and generates the base station downlink signal to be transmitted from each second antenna 24. The MIMO communication unit 234 transmits each generated base station downlink signal from the second antenna 24 by MIMO (step S127). When transmitting all pieces of the spectral data stored in the storage unit 221, the LEO satellite 2 returns the processing to step S121.

Figure 8:
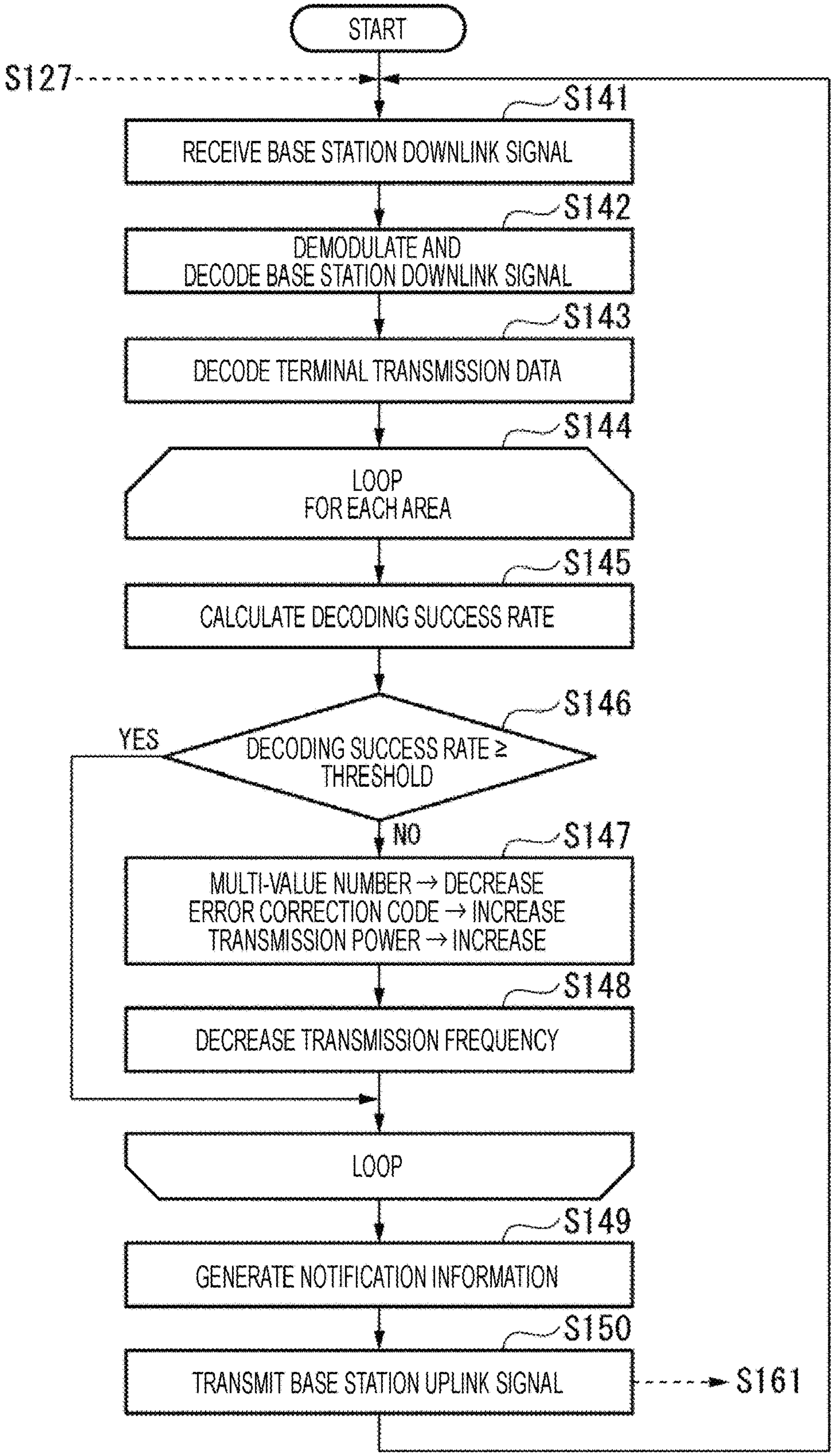
FIG. 8 is a flowchart illustrating processing of the base station according to the embodiment.

FIG. 8 is a flowchart illustrating processing of the base station 7 according to the embodiment. Each GWL 5 of the base station 7 receives the base station downlink signal from the LEO satellite 2 (step S141). Each GWL 5 outputs, to the MIMO reception unit 71, a received signal that is an electrical signal into which the received base station downlink signal has been converted. The MIMO reception unit 71 synchronizes timing of the received signals received from the GWLs 5. The MIMO reception unit 71 combines the received signals received by the GWLs 5 on the basis of the weight. The base station signal reception processing unit 72 demodulates the combined received signal (step S142). The base station signal reception processing unit 72 outputs the waveform data obtained by decoding the demodulated received signal to the terminal signal reception processing unit 73.

The terminal signal reception processing unit 73 decodes the symbol of the terminal uplink signal indicated by the waveform data to obtain the terminal transmission data transmitted from the terminal station 4 (step S143). Note that the terminal signal reception processing unit 73 can also use a decoding method having a large calculation load, such as successive interference cancellation (SIC).

The analysis unit 74 selects the plurality of areas on the ground one by one (step S144), and executes processing of following steps S145 to S148 for the selected area. First, the analysis unit 74 calculates the decoding success rate of the terminal uplink signal of the area selected in step S144 on the basis of the terminal uplink signal received by the terminal signal reception processing unit 73 (step S145). The analysis unit 74 determines whether the decoding success rate is a predetermined threshold or more (step S146). In a case where the decoding success rate is the threshold or more (step S146: YES), the analysis unit 74 maintains the transmission scheme and the transmission frequency related to the area selected in step S144.

On the other hand, in a case where the decoding success rate is less than the threshold (step S146: NO), the analysis unit 74 decreases the multi-value number of the transmission scheme related to the area selected in step S144 by a unit amount, increases the bit count of the error correction code by the unit amount, and increases the transmission power by the unit amount (step S147). The unit amounts of the multi-value number, the bit count, and the power are determined in advance. In addition, the analysis unit 74 multiplies the transmission frequency of the terminal uplink signal by a predetermined decrease rate (a value greater than 0 and less than 1) and decreases the transmission frequency (step S148).

The notification information generation unit 75 generates the notification information indicating the orbit information of the LEO satellite 2 and the transmission scheme and the transmission frequency adjusted in steps S144 to S148 (step S149). The transmission unit 76 transmits the notification information generated by the notification information generation unit 75 to the GEO satellite 3 via the GWG 6 as the base station uplink signal (step S150). Then, the base station 7 repeats the processing from step S141.

Figure 9:
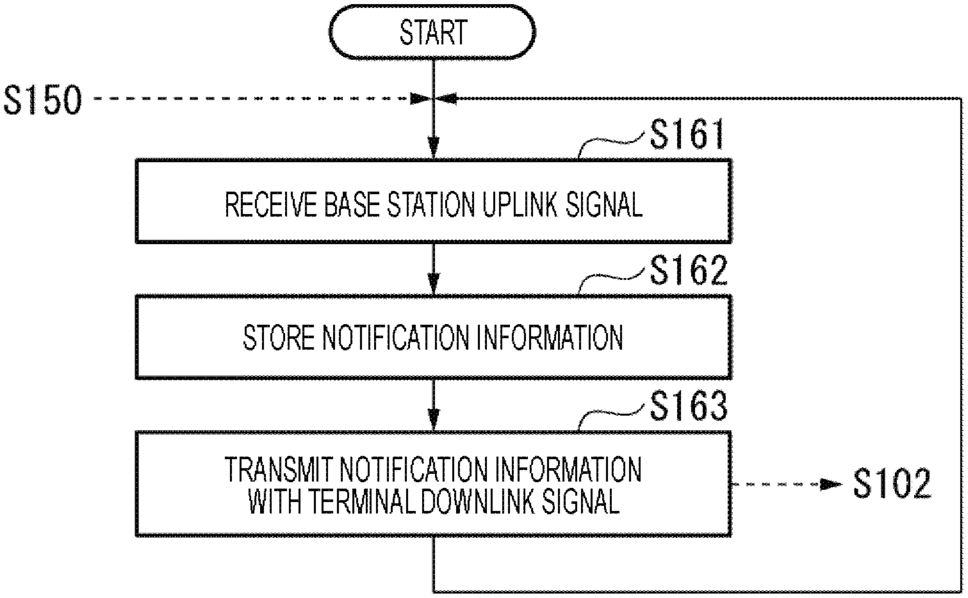
FIG. 9 is a flowchart illustrating processing of the GEO relay station according to the embodiment.

FIG. 9 is a flowchart illustrating processing of the GEO relay station 30 according to the embodiment. The reception unit 321 of the GEO relay station 30 receives the base station uplink signal from the GWG 6 via the antenna 31 (step S161). The reception unit 321 stores the notification information included in the received base station uplink signal in the storage unit 322 (step S162). The transmission unit 323 transmits the notification information stored in the storage unit 322 to the terminal station 4 via the antenna 31 with the terminal downlink signal (step S163).

According to the first embodiment, the terminal station 4 receives the notification information generated on the basis of the communication status between the LEO satellite 2 and the terminal station 4 from the GEO satellite 3, and transmits data to the LEO satellite 2 by the transmission method specified in the notification information. Thereby, the terminal station 4 can transmit data to the LEO satellite 2 by the transmission method according to the communication status. As a result, the wireless communication system 1 can avoid collision of the terminal uplink signals between the terminal stations 4 and improve the communication efficiency. As the communication efficiency is improved, the transmission power of the terminal station 4 can be reduced.

Since the GEO satellite 3 has more communication opportunities with the terminal station 4 than the LEO satellite 2, the terminal station 4 can reliably receive the notification information and determine the transmission method according to the communication status.

Second Embodiment

The base station 7 according to the first embodiment determines the transmission method and the transmission frequency of the terminal station 4 for each area. In contrast, a base station 7 according to a second embodiment determines a transmission method and transmission start timing for each terminal station 4. A configuration of a wireless communication system 1 is similar to that of the first embodiment.

An analysis unit 74 of the base station 7 according to the second embodiment reduces an allowable number of simultaneous transmissions of terminal uplink signals for an area in which a decoding success rate is lower than a threshold. The base station 7 determines transmission start timing of a plurality of terminal stations 4 belonging to the area so as to satisfy the changed allowable number of simultaneous transmissions. Note that a transmission scheme of the terminal station may be determined by a method similar to that in the first embodiment. A notification information generation unit 75 of the base station 7 generates notification information that stores the transmission scheme and the transmission start timing of the base station 7 in association with an ID of the base station 7.

The terminal station 4 according to the second embodiment does not randomly determine the transmission start timing, and transmits the terminal uplink signal at the transmission start timing indicated by the notification information.

According to the second embodiment, the terminal station 4 receives the notification information generated on the basis of a communication status between an LEO satellite 2 and the terminal station 4 from a GEO satellite 3, and transmits data to the LEO satellite 2 at the transmission start timing specified in the notification information. Thereby, the wireless communication system 1 can avoid collision of the terminal uplink signals between the terminal stations 4 and improve communication efficiency. As the communication efficiency is improved, the transmission power of the terminal station 4 can be reduced.

The terminal station 4 includes a processor, a memory, an auxiliary storage device, and the like connected by a bus, and functions as a device including a reception unit 42, a positioning unit 43, a condition determination unit 44, and a transmission unit 45 by executing a program. In addition, the base station 7 includes a processor, a memory, an auxiliary storage device, and the like connected by a bus, and functions as a device including the analysis unit 74, the notification information generation unit 75, and a transmission unit 76 by executing a program. Examples of the processor include a central processing unit (CPU), a graphic processing unit (GPU), and a microprocessor. The program may be recorded on a computer-readable recording medium. The computer-readable recording medium is a storage device such as a magnetic disk, a magneto-optical disk, an optical disk, or a semiconductor memory, for example. The program may be transmitted via an electrical communication line.

All or some of the functions of the terminal station 4 or the base station 7 may be implemented by using a custom large scale integrated circuit (LSI) such as an application specific integrated circuit (ASIC) or a programmable logic device (PLD). Examples of the PLD include a programmable array logic (PAL), a generic array logic (GAL), a complex programmable logic device (CPLD), and a field programmable gate array (FPGA). Such an integrated circuit is also included in the examples of the processor.

Other Embodiments

Although embodiment has been described in detail with reference to the drawings, specific configurations are not limited to the above-described configurations, and various design changes and the like can be made thereto. That is, in other embodiments, the order of the above-described processing may be changed as appropriate. Further, some pieces of processing may be executed in parallel.

The LEO relay station 20, the GEO relay station 30, the terminal station 4, and the base station 7 according to the above-described embodiments may be configured by a single computer, or may be configured such that the functional configuration is divided into a plurality of computers and the plurality of computers cooperates with each other.

According to the above-described embodiments, the GEO satellite 3 is an example of a second communication device that transmits the notification information to the terminal station 4, but the embodiments are not limited thereto. For example, in another embodiment, a quasi-zenith satellite or a mid-orbit satellite may transmit the notification information to the terminal station 4. Further, in another embodiment, a high altitude platform station (HAPS) or a drone having an altitude lower than the LEO satellite 2 may transmit the notification information. Further, in another embodiment, the base station 7 may directly transmit the notification information to the terminal station 4 by connecting each terminal station 4 and the base station 7 via a network. Further, in another embodiment, the notification information may be transmitted to the terminal station 4 via a ground wireless communication network. That is, the second communication device may be a base station on the ground constituting a mobile communication network or a fixed wireless communication network (for example, fixed wireless access (FWA)). Note that, even in these cases, it is favorable that the communication device that transmits the notification information have more communication opportunities with the terminal station 4 than the LEO satellite 2.

According to the above-described embodiments, the transmission scheme and the transmission frequency are adjusted when the communication status between the LEO satellite 2 and the terminal station 4 is poor, and the transmission scheme and the transmission frequency are maintained when the communication status is good, but the embodiments are not limited thereto. For example, in another embodiment, the transmission scheme and the transmission frequency may be adjusted so as to improve the communication quality when the communication status between the LEO satellite 2 and the terminal station 4 is poor, and the transmission scheme and the transmission frequency may be adjusted so as to improve the communication efficiency when the communication status is good.

In the above-described embodiments, the quality of the communication status is specified by the decoding success rate of the terminal uplink signal, but the embodiments are not limited thereto. For example, in another embodiment, the quality of the communication status may be specified using another value related to the statistical value of the communication probability between the LEO satellite 2 and the terminal station 4, such as an average value of channel capacities. The channel capacity can be obtained from, for example, an error rate of the terminal uplink signal.

In the above-described embodiments, the base station 7 analyzes the communication status between the LEO satellite 2 and the terminal station 4 and adjusts the transmission scheme and the transmission frequency, but the embodiments are not limited thereto. That is, in another embodiment, the notification information may not include the transmission scheme and the transmission frequency. For example, in another embodiment, the base station 7 may transmit notification information indicating the decoding success rate for each area to the GEO satellite 3, and the GEO satellite 3 or the terminal station 4 that has received the notification information from the GEO satellite 3 may adjust the transmission scheme and the transmission frequency on the basis of the decoding success rate. That is, in the wireless communication system 1, the capacity specifying unit 223 and the scheme determination unit 224 may be included in the LEO satellite 2 or may be included in the terminal station 4.

In the above-described embodiments, the LEO satellite 2 moves above the earth, and the terminal stations 4 and the base station 7 are provided on the earth. However, the wireless communication system 1 according to another embodiment may use a celestial body other than the earth, such as the moon.

REFERENCE SIGNS LIST

1 Wireless communication system
2 LEO satellite
20 LEO relay station
21 First antenna
22 Terminal communication unit
221 Storage unit
222 Reception schedule determination unit
223 Reception unit
224 Combining unit
225 Spectrum conversion unit
23 Base station communication unit
231 Storage unit
232 Transmission schedule determination unit
233 Control unit
234 MIMO communication unit
235 Data generation unit
236 Transmission data modulation unit
24 Second antenna
3 GEO satellite
30 GEO relay station
31 Antenna
32 Earth station communication unit
321 Reception unit
322 Storage unit
323 Transmission unit
4 Terminal station
41 Data storage unit
42 Reception unit
43 Positioning unit
44 Condition determination unit
45 Transmission unit
46 Antenna
5 GWL

6 GWG
7 Base station
71 MIMO reception unit
72 Base station signal reception processing unit
73 Terminal signal reception processing unit
74 Analysis unit
75 Notification information generation unit
76 Transmission unit

The invention claimed is:

1. A communication system comprising:
- a first communication device that performs communication while moving;
- a transmission device that transmits data to the first communication device; and
- a second communication device that communicates with the transmission device, wherein
- the second communication device transmits notification information related to a communication status between the transmission device and the first communication device to the transmission device, and
- the transmission device determines a transmission method of the data to the first communication device on a basis of the notification information received from the second communication device, and transmits the data to the first communication device by the determined transmission method.

2. The communication system according to claim 1, further comprising:
- a base station that receives the data from the first communication device, wherein
- the first communication device transmits the data received from the transmission device to the base station,
- the base station generates the notification information on a basis of the data received from the first communication device and transmits the notification information to the second communication device, and
- the second communication device transmits the notification information received from the base station to the transmission device.

3. The communication system according to claim 2, wherein
- the transmission device and the base station are provided on a celestial body,
- the first communication device is provided on a low earth orbit satellite that moves above the celestial body, and
- the second communication device is provided on a geostationary satellite located above the celestial body.

4. The communication system according to claim 2, further comprising:
- a plurality of transmission devices including the transmission device, wherein
- the base station generates the notification information on a basis of a statistical value of a communication probability of the plurality of transmission devices.

5. The communication system according to claim 4, wherein
- the base station generates the notification information for causing the transmission device to change the transmission method in a case where the statistical value of the communication probability of the plurality of transmission devices is equal to or less than a predetermined threshold.

6. The communication system according to claim 1, wherein
- a communicable period between the transmission device and the second communication device is longer than a communicable period between the transmission device and the first communication device.

7. A communication method by a first communication device that performs communication while moving, a transmission device that transmits data to the first communication device, and a second communication device that communicates with the transmission device, the communication method comprising:

transmitting, by the second communication device, notification information related to a communication status between the transmission device and the first communication device to the transmission device;

determining, by the transmission device, a transmission method of the data to the first communication device on a basis of the notification information received from the second communication device; and transmitting, by the transmission device, the data to the first communication device by the determined transmission method.

* * * * *